June 10, 1969     R. R. CRABTREE ETAL     3,448,654
GRENADE EJECTOR
Filed March 5, 1968
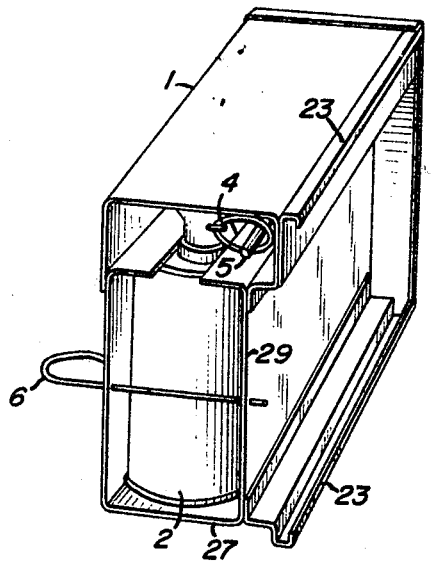
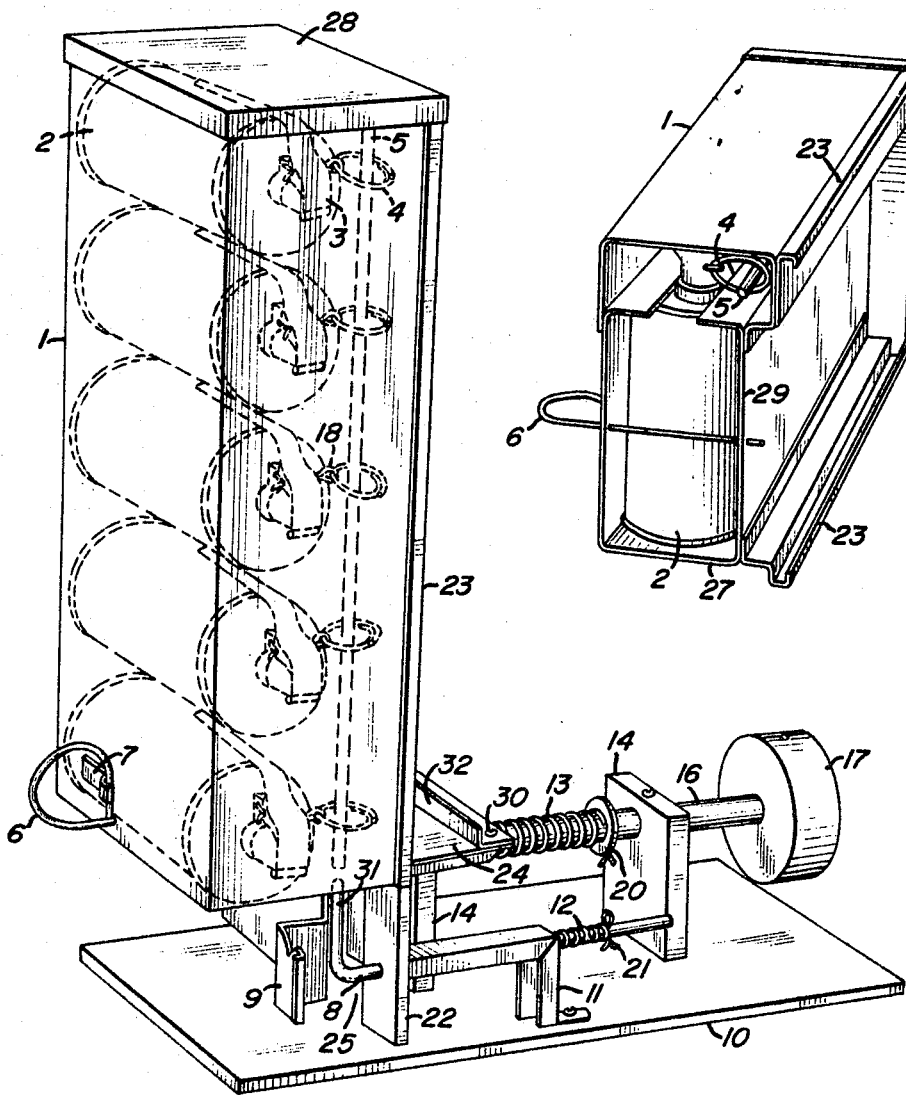
INVENTORS
Royale R. Crabtree
Charles W. Beeker
Dennis E. Mead
ATTORNEYS June 10, 1969   R. R. CRABTREE ET AL   3,448,654
GRENADE EJECTOR Filed March 5, 1968

INVENTORS
Royale R. Crabtree
Charles W. Beeker
Dennis E. Mead

BY Harry M. Saragovitz
Edward J. Kelly, Herbert Berl
& Bernard Ohlendorf
ATTORNEYS

United States Patent Office 3,448,654
Patented June 10, 1969

3,448,654
GRENADE EJECTOR
Royale R. Crabtree, Towson, and Charles W. Beeker, Parkville, Md., and Dennis E. Mead, Los Angeles, Calif., assignors to the United States of America as represented by the Secretary of the Army
Filed Mar. 5, 1968, Ser. No. 710,455
Int. Cl. F41f 5/00
U.S. Cl. 89—1.5                                 12 Claims

ABSTRACT OF THE DISCLOSURE

A smoke grenade ejector assembly and mode of operation thereof comprising a base plate; a guide means fixedly and perpendicularly mounted on said base plate; magazine means containing grenades slidably mounted on said guide means; means to discharge said grenades from said magazine to permit arming and ejection thereof; means to arm said grenades; and means to eject said grenades.

---

The invention described herein may be manufactured, used, and licensed by or for the Government for governmental purposes without the payment to us of any royalty thereon.

Our invention relates to the method and apparatus for ejecting smoke grenades from an aircraft.

It is frequently necessary to mark a specific ground location for various purposes such as the location of an enemy position, location of a survivor on land or water, location of a wreckage, etc. Such specific location is ascertained by an aircraft flying thereover, a smoke grenade is ejected over the location, and the location is marked by the smoke dispensed from the ejected grenade.

The prior art method of ejecting the smoke grenades from the aircraft comprised the steps of storing the grenades loosely within the aircraft and manually ejecting the grenade when the target location was observed. Such storing and manual ejection created the problem of grenades occasionally being accidentally discharged within the aircraft, by accidentally dropping an armed grenade or a safety pin accidentally being pulled loose to arm and ignite the grenade, resulting in the aircraft being filled with the irritating smoke which blinded the pilot on occasions and igniting any combustible materials in the vicinity of the burning grenade within the aircraft. Another problem associated with manual ejection was the inability of human reaction time to throw out more than one grenade, where two or more were required, before the speed of the aircraft carried past the target location, and resulted in additional passes of the aircraft over the target location to adequately smoke mark being required. Our invention hereinafter described was conceived to overcome these problems.

A principal object of our invention is to provide a reliable and safe means and method for ejecting smoke grenades from an aircraft to mark target locations.

A further object of our invention is to provide a method and means for rapidly ejecting all necessary smoke grenades from aircraft over a target location while utilizing a minimum number of passes over the target location.

Other objects of our invention will be obvious or will appear from the specification hereinafter set forth.

FIGURE 1 is a perspective view of our aircraft grenade ejector showing the grenades stored in the magazine.

FIGURE 2 is a perspective view of the magazine of our grenade ejector showing the grenades stored therein and retained by a retaining pin.

Figure 3:
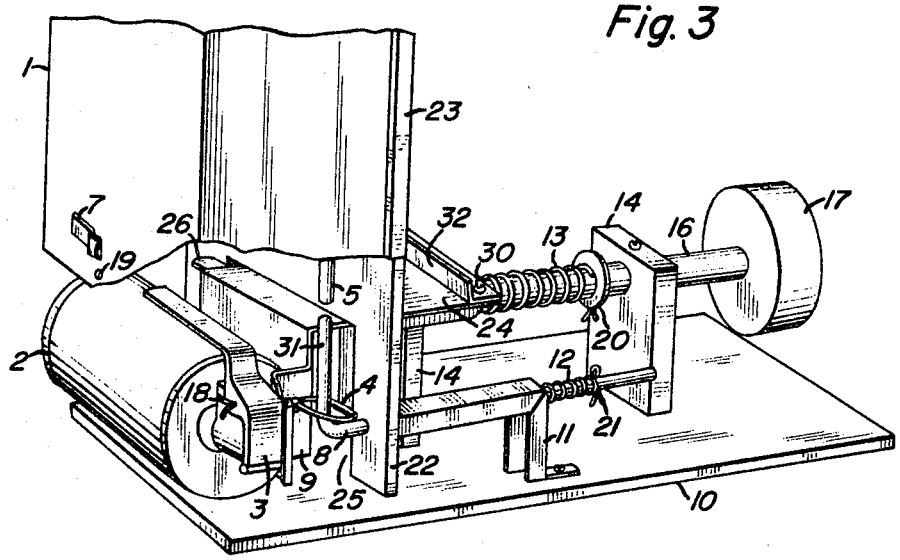
FIGURE 3 is a perspective view of our grenade ejector showing a grenade in position to be armed and ejected.

Our invention and FIGURES 1 to 4 will now be described in detail as follows:

As shown in FIGURES 1 and 2, our grenade ejector is mounted in any convenient opening of the aircraft, such as the doorway thereof, by means of the base plate 10. This base plate is fastened to the floor of the aircraft or any other convenient supporting member in the aircraft opening by any conventional fastening means such as nuts and bolts, screws, rivets, welding, etc. While the aircraft is in transient toward the target location, the grenades are stored in magazine 1 and retained in the stored position by pull rod 6 which is held in the closed position by clip 7. Magazine 1 can be loaded at the point of departure prior to aircraft take-off or in flight. The loading operation is accomplished by sliding magazine 1, at this point empty and with retaining rod 6 removed, upward until channel 23 is completely disengaged from back plate 22, and the magazine is inverted after disengagement so that open end 27 is in the up position. Smoke grenades 2, having safety pin 18 locking grenade handle 3 in the unarmed, or safe, position, in the conventional manner, are loaded into magazine 1 in the manner shown in FIGURE 1 so that the safety pin pull ring 4 is placed over and encircles the pull ring guide rod 5. Pull ring guide rod 5 is fixedly mounted to magazine top 28 by any conventional fastening means such as welding, threaded connection means, etc. After magazine 1 is filled in this manner, retaining pin 6 is inserted in holes 19 (shown in FIGURE 4) and locked in the inserted position by means of clip 7. The loaded magazine is then placed in position on the ejector back plate by engaging channels 23 with back plate 22, fixedly mounted to base plate 10 in any conventional manner such as welding, and sliding the magazine downward until back edge 29 of magazine 1 rests on ejection piston platform 24. When the magazine is in the fully down position, pull ring guide rod 5 just touches pull ring rod 8 in a manner so that the surfaces of the ends of the two rods will slide over each other. The ejection piston for activating platform 24 consists of two components; a kick plate 17 and rod 16, the rod being fixed mounted at one end by any conventional fastening means, such as a screw, weld, etc., and slidably mounted in supports 14, fixedly mounted to base plate 10 by any conventional means such as welding. Pull ring rod 8 is held under tension by spring 12 and mounted by means of support 11, fixedly mounted to base plate 10 by any conventional fastening means such as screws. Spring 12 is retained in position by pin 21.

Figure 4:
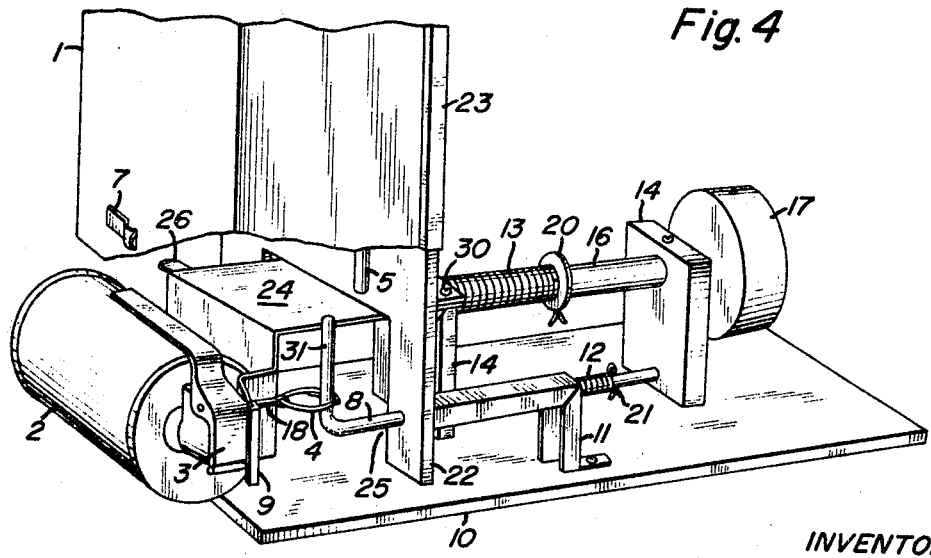
FIGURE 4 is a perspective view of our grenade ejector showing the grenade safety pin being pulled to arm the grenade and the grenade being ejected.

FIGURES 3 and 4 show the mode of operation of the above described grenade ejector. When the aircraft reaches the target location, retainer pin 6 is unlocked and withdrawn from magazine 1 which permits the bottom grenade to drop to base plate 10 and pull ring 4 to fall over and encircle upright end 31 of pull rod 8. In this position, ejecting platform 24 is located in opening 25 so that detent 26 rests against back plate 22, the detent being a means to prevent platform 24, which is under tension by means of spring 13, from being pulled further toward the rear. When the aircraft reaches the point of ejection, kickplate 17 is pushed forward, either manually or by any conventional automatic means such as an electro-pneumatic system, which in turn moves platform 24 forward by means of rod 16. Platform 24, as shown in FIGURE 4, then shoves the grenade forward and safety pin 18 is removed from grenade 2 by pulling rod 8 which permits handle 3 to fly back and ignite the grenade fuze (not shown in the drawing) in the conventional manner. When the fuze ignites, the platform 24 has reached the end of its travel, the grenade has reached the end of base 10 (as shown in FIGURE 4), and grenade 2, since base 10 projects slightly outside of the aircraft, falls earthward toward the target location. The platform 24 is then returned to the starting position with detent 26 resting against back plate 22 by means of spring 13, the spring being retained in position by the conventional means of washer and pin assembly 20. Another grenade then automatically drops in place as described above, and the operation is repeated as described above until all of the desired number of grenades have been ejected. The forward travel of platform 24 is limited by stop 32, fastened by any conventional means to platform 24 such as screws 30. Spring 13 functions to permit pull ring pull rod 8 to travel approximately ½ inch prior to exerting a pull on pull ring 4 in order to permit grenade handle 3 to fly free of magazine 1 upon removal of pin 18. While FIGURE 1 shows five grenades disposed in magazine 1, the magazine can be made to any desired dimensions to hold any number and any size grenades. Structure 9 serves the purpose of exerting a force in line with safety pin 18 in order to extract the pin. Structure 9 also serves to maintain the alignment of the grenade head and safety pin 18 during the ejection cycle.

It is obvious that other modifications can be made of our invention, and we desire our invention to be limited only by the scope of the appended claims.

We claim:

1. A grenade ejector assembly comprising a base plate; a guide means fixedly and perpendicularly mounted near one end of said base plate; an opening within said guide means located at the end of said guide means which is fixedly mounted to said base plate; a magazine means slidably mounted on said guide means, said magazine means having one end open and cover means on the other end; means slidably mounting said magazine means on said guide means; a first rod means located within and projecting the length of said magazine means, said rod means being fixedly mounted to said cover means; retainer means for holding articles within said magazine means; locking means to provide locking action for said retainer means; stop means to limit the downward travel of the magazine means; ejector means slidably mounted and located below said magazine means and within the opening within said guide means; means for slidably mounting said ejector means, said means being fixedly and perpendicularly mounted to said base plate at the end opposite to the end on which said guide means is located; stop means limiting the forward travel of said ejector means; stop means limiting the rearward travel of said ejector means; means for holding said ejector means under tension; means for activating said ejector means; a second rod means located adjacent to said ejector means and below said first rod means, the end of said second rod means being adapted to come in sliding contact with the end of said first rod means, this end of said first rod means being opposite to that attached to said cover means; means for mounting said second rod means, said mounting means being fixedly and perpendicularly mounted to said base plate; and means for holding said second rod means under tension.

2. The assembly of claim 1 wherein the means for slidably mounting the magazine means on the guide means is a channel.

3. The assembly of claim 1 wherein the retainer means is a pull rod located near the open end of the magazine means.

4. The assembly of claim 3 wherein the pull rod is aligned by means of two holes, one hole located in the front and the other in the rear of said magazine means.

5. The assembly of claim 1 wherein the locking means is a spring clip.

6. The assembly of claim 1 wherein the ejector means comprises a rod member; a kick plate member fixedly mounted to said rod member at the end opposite to said guide means; and a platform member fixedly mounted to said rod member at the end opposite to said kick plate member.

7. The assembly of claim 1 wherein the means for holding the ejector means under tension is a spring.

8. The assembly of claim 1 wherein the means for activating said ejector means is manual.

9. The assembly of claim 1 wherein the means for activating said ejector means is an automatic means.

10. The assembly of claim 9 wherein the automatic means is an electro-pneumatic means.

11. The assembly of claim 1 wherein the means for holding said second rod means under tension is a spring.

12. A method of ejecting smoke grenades after removal of safety pins and pull rings therein over a target location comprising the steps of providing a base plate; fixedly mounting said base plate within an aircraft and projecting one end of said base plate through an opening in said aircraft; fixedly and perpendicularly mounting a guide means to said base plate near the end thereof which projects from the aircraft; providing a magazine means having one end open and the other end closed, a first rod means projecting from said closed end the length of the magazine means; loading the magazine means with smoke grenades, the pull rings of said grenades encircling said first rod means; retaining said grenades within said magazine means by a retaining means; slidably mounting said magazine means on said guide means; providing an ejector means; providing a second rod means adapted to arm the grenade as a result of removing the grenade safety pin; removing the retaining pin from said magazine means resulting in a grenade dropping to said base plate and the pull ring encircling said second rod means; activating said ejector means resulting in said grenade being armed and ejected from said aircraft.

References Cited

UNITED STATES PATENTS

| | | | |
|---|---|---|---|
| 2,462,922 | 3/1949 | Temple | 89—1.5 X |
| 3,298,307 | 1/1967 | Hunt | 89—1.5 X |

SAMUEL W. ENGLE, *Primary Examiner.*

U.S. Cl. X.R.

102—37.4